United States Patent Office 2,912,468
Patented Nov. 10, 1959

2,912,468

POLYALKOXYACETALS OR POLYALKOXY KETALS AND THE SULFUR ANALOGUES

John W. Copenhaver, Short Hills, N.J., assignor to General Aniline & Film Corporation, New York, N.Y., a corporation of Delaware No Drawing. Application December 24, 1956
Serial No. 630,019

4 Claims. (Cl. 260—609)

The invention here presented is a new synthesis for the preparation of polyalkoxy acetals and ketals and the sulfur analogues thereof by a simple and inexpensive procedure whereby the cost of these compounds is very substantially reduced.

There are many reactions which will yield valuable and useful substances such as dyestuffs, pharmaceuticals, synthetic resins and the like, utilizing such polyalkoxyacetals and ketals, which have been commercially unfeasible because of the high cost of these substances which, in the past, have usually been made by the reaction of acetals and ketals with $\alpha,\beta$-unsaturated ethers as disclosed in U.S. 2,165,962, U.S. 2,487,525, U.S. 2,561,307 and the like, due to the need for appropriate substituents on the unsaturated carbons of the $\alpha,\beta$-unsaturated ether intermediates, said intermediates thereby yielding complicated, difficult, uncertain and expensive synthetic problems.

According to the present invention it is found that in the presence of an acid catalyst, an equilibrium exists between an acetal, or a ketal, and the corresponding alcohol and $\alpha,\beta$-unsaturated ether, according to the following equations:

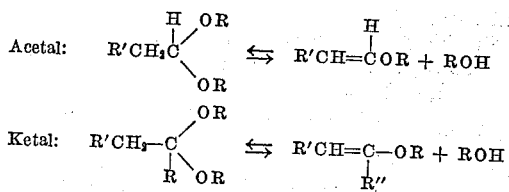

By removing the alcohol from the equilibrium mixture, the equilibrium can be forced in the direction of the $\alpha,\beta$-unsaturated ether by any desired amount, and it is then found that the resulting $\alpha,\beta$-unsaturated ether will react with other portions of the acetal or ketal to form a polyalkoxy acetal, or polyalkoxy ketal. This reaction removes the vinyl ether from the equilibrium mixture shown and further favorably influences the shift in equilibrium. The readily available acetals and ketals can be used as one reactant and as the precursor of the second reactant, as outlined in the following equation:

(1) $CH_3CH(OR)_2 \rightleftharpoons ROH + CH_2=CHOR$ $CH_3CH(OR)_2 + nCH_2=CHOR \longrightarrow$

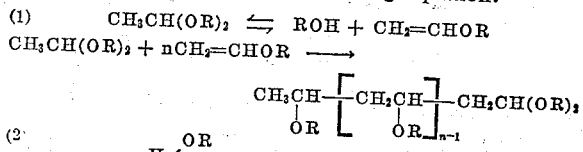

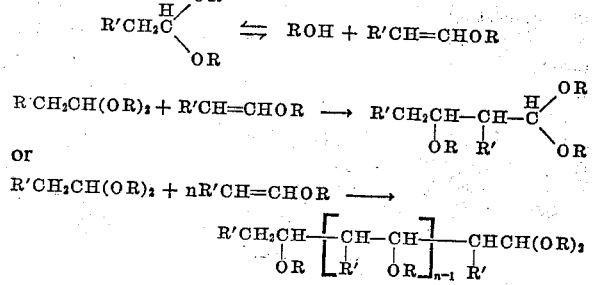

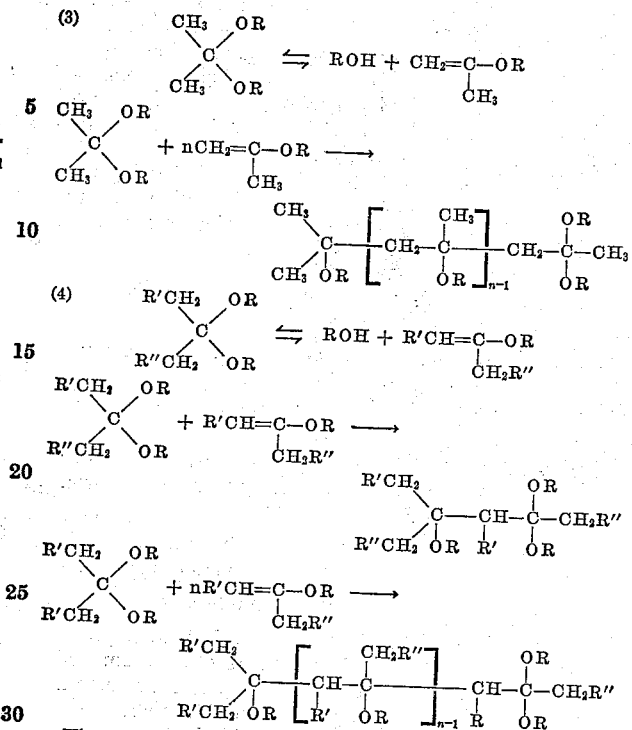

The reaction is not limited to the oxygen containing compounds but applies similarly to the sulfur analogues such as the mercaptals and mercaptols, as shown in the following equation:

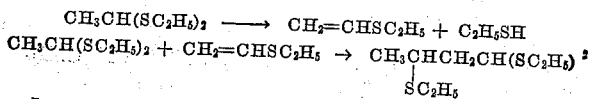

In general, these reactions may be carried out by adding to the acetal, ketal, and the like, or to their sulfur analogues, a very small amount of an acid catalyst, usually of the Friedel-Crafts type, such as aluminum chloride, zinc chloride and the like, but preferably boron fluoride, or complexes thereof (usually the etherate or hydrate). These catalysts are satisfactory for the more easily condensable substances, and for the simpler reactions. If however difficulty is encountered and a more potent catalyst is used, such compositions as solutions of aluminum chloride or boron trifluoride in non-aqueous, anhydrous solvents such as ethyl or methyl chloride may be used. The reaction is desirably conducted at a mildly elevated temperature sufficient to distill out the alkanol or alkanethiol component which is split out in the reaction. The alkanol or alkanethiol is removed sometimes in the form of an azeotrope of the acetal or the ketal and the cleaved methanol, or ethanol, or propanol, or butanol, or mercaptan, or the like. It will be observed that the removal of the alcohol by distillation, or evaporation, permits the reaction to proceed by a shifting of the equilibrium. It may further be noted that this distillation can usually be done at atmospheric pressure, but in some instances the boiling point of the alcohol or other material is too low for satisfactory conduct of the remainder of the reaction, in which case the distillation may be conducted under pressure. Alternatively, in some instances, the boiling point of the alcohol is high so that the alkanol or alkanethiol cannot be removed satisfactorily at atmospheric pressure or may lead to breakdown at such elevated temperatures to yield undesired side reactions. In such case, the distillation may be conducted at reduced pressure. Furthermore, it is usually preferable not to carry the reaction to complete conversion, since, when the reaction is carried beyond about 75 percent, the material tends to resinify and to yield higher boiling, undesired products from side reactions.

Thus the basic procedure involves a shift of the equilibrium in the desired direction by removal of the resulting alcohol or mercaptan to permit, under acid conditions, condensation of a portion of the resulting $\alpha,\beta$-unsaturated ether with a portion of the original acetal or ketal to yield the desired polyalkoxyacetal, polyalkoxyketal, polyalkylthiomercaptals (thioacetals) and polyalkylthiomercaptols (thioketals).

The following examples are offered as indicating the best way now known of practicing the invention but are not intended to limit the scope of the claims in any way.

EXAMPLE 1

*Preparation of 1,1,3-trimethoxy butane from dimethyl acetal*

The following reaction occurs according to this example

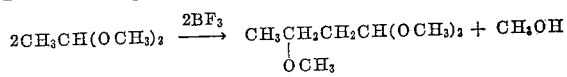

The following materials were put together in the order and in the quantities listed to yield the product shown.

360 g. (4 moles) of dimethyl acetal and
4 ml. of boron fluoride etherate was charged to a 1000 ml. flask attached to a packed fractionating column.

The reaction mixture was heated to reflux and 50 ml. of distillate, B.P. 57° C. $n_D^{25}$ 1.3579, corresponding to the methanol-dimethyl acetal azeotrope, removed as rapidly as the temperature at the head of the column could be maintained. The boron fluoride etherate was neutralized with ethanolamine and the distillation continued to give an additional 30 ml. of the methanol-dimethyl acetal azeotrope, B.P. 57° C., $n_D^{25}$ 1.3578.
258 ml. of unreacted dimethyl acetal, B.P. 64° C., $n_D^{25}$ 1.3640,
38 ml. of 1,1,3-trimethoxybutane, B.P. 57 to 62° C./20 mm., and
6 ml. of higher boiling material.

The fraction boiling at 57 to 62° C./20 mm. was refractionated at atmospheric pressure and boiled at 152 to 154° C., and had $n_D^{25}$ 1.4010 and $d_4^{25}$ 0.9163. Authentic 1,1,3-trimethoxy butane boils at 154° C., and has $n_D^{25}$ 1.4010 and $d_4^{25}$ 0.9145. The identity of the product was confirmed by conversion to the 2,4-dinitrophenyl hydrazone of crotonaldehyde, which is the product formed from authentic 1,1,3-trimethoxy butane under identical reaction conditions.

EXAMPLE 2

*Preparation of 1,1,3-tri-thioethyl butane*

The following reaction occurs according to this example:

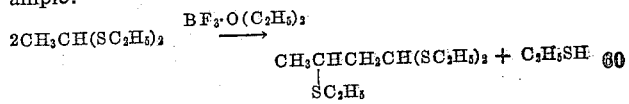

The following materials were put together in the order and in the quantities listed to yield the product shown.

75 g. (0.5 mole) diethyl mercaptal and
0.5 ml. of boron fluoride etherate was charged to a 150 ml. flask attached to a small packed fractionating column heated to reflux and
11 ml. ethyl mercaptan boiling at 35° C./760 mm. was removed as rapidly as possible. The boron fluoride etherate was neutralized with sodium methylate and distillation continued to yield
18 g. unreacted diethyl mercaptal and
13 g. 1,1,3-tri-thioethyl butane boiling at 159° C./17 mm., $n_D^{25}$ 1.5210.

*Analysis theory.*—C, 50.36%; H, 9.30%; S, 40.33%.
Found: C, 50.38%; H, 9.16%; S, 40.43%.

EXAMPLE 3

*Preparation of 1,1,3-triethoxy-2-ethyl hexane*

The following reaction occurs according to this example:

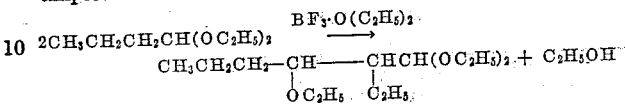

The following materials were put together in the order and in the quantities listed to yield the product shown.

435 g. (3 moles) diethyl butyral and
2.2 ml. of boron fluoride etherate was charged to a 100.0 ml. flask attached to a fractionating column and heated to reflux.
27 g. (0.58 mole) of ethanol was removed as rapidly as the temperature at the head of the column could be maintained at 78° C. The boron fluoride etherate was neutralized with ethanolamine and distillation continued. After removing more ethanol and the unreacted diethyl butyral, there was obtained
68 g. of 1,1,3-triethoxy-2-ethyl hexane, B.P. 94° C./4 mm., $n_D^{25}$ 1.4272 and smaller amounts of higher homologues boiling over a range up to 192° C./5 mm.

The 1,1,3-triethoxy-2-ethyl hexane was characterized by analysis: Theory: C, 68.24%; H, 12.27%. Found: C, 69.14%; H, 12.22%.

Reaction with 2,4-dinitrophenyl hydrazine in the usual manner gave the 2,4-dinitrophenyl hydrazone of 2-ethyl-2-hexanal, M.P. 123° C.

*Analysis.*—Theory: C, 54.90%; H, 5.92%; N, 18.29%.
Found: C, 54.94%; H, 5.89%; N, 17.96%.

The reported melting point for the derivative is 122° C. (Compt. rend. 196, 278 (1933) and 124–125° C. Chem. and Ind. 52, 519 1933.)

Thus the reaction and process of the present invention produce a wide range of products which are valuable for a wide range of subsequent organic reactions for the manufacture of dyestuffs, pharmaceuticals, synthetic resins and the like.

While there are above disclosed but a limited number of embodiments of the process of the invention, it is possible to provide still other embodiments without departing from the inventive concept herein disclosed, and it is therefore desired that only such limitations be imposed upon the appended claims as are stated therein or required by the prior art.

The invention claimed is:

1. The method of making compounds selected from the group consisting of alkoxy substituted acetals and ketals and the sulfur analogues thereof and represented by the formula

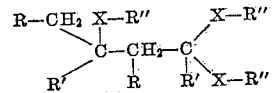

wherein R represents a member of the group consisting of hydrogen and alkyl, R' represents a member of the group consisting of hydrogen and alkyl, R" represents a lower alkyl and X represents a chalkogen having an atomic weight less than 33, which comprises heating to reflux in the presence of a small amount of boron fluoride, a compound selected from the group consisting of acetals and ketals and the sulfur analogues thereof and having the formula

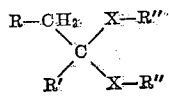

wherein R, R' and R" and X are as defined above, while removing by distillation any compound of the formula

R"—X—H formed.

2. The process of producing 1,1,3-trimethoxybutane which comprises heating to reflux, in the presence of a small amount of boron fluoride, dimethyl acetal, while removing by distillation during said heating step any methyl alcohol formed, whereby there is produced said 1,1,3-trimethoxybutane.

3. The method of producing 1,1,3-tri-thioethyl butane which comprises heating to reflux, in the presence of a small amount of boron fluoride, diethyl mercaptal, while removing by distillation during said heating step any ethyl mercaptal formed, whereby there is produced said 1,1,3-tri-thioethyl butane.

4. The method of preparing 1,1,3-triethoxy-2-ethyl hexane which comprises heating to reflux, in the presence of a small amount of boron fluoride, diethyl mercaptal, while removing during said heating step by distillation any ethanol produced, whereby there is obtained the said 1,1,3-triethoxy-2-ethyl hexane.

References Cited in the file of this patent

UNITED STATES PATENTS

| 2,066,191 | Turner | Dec. 29, 1936 |
| 2,229,665 | Mochel | Jan. 28, 1941 |
| 2,622,101 | Paul et al. | Dec. 16, 1952 |

OTHER REFERENCES

Killian et al.: Jour. Amer. Chem. Soc., vol. 57 (1935), pp. 544–545.

UNITED STATES PATENT OFFICE
CERTIFICATE OF CORRECTION

Patent No. 2,912,468                      November 10, 1959

John W. Copenhaver

It is hereby certified that error appears in the printed specification of the above numbered patent requiring correction and that the said Letters Patent should read as corrected below.

Column 2, lines 36 to 38, for that portion of the formula reading "$CH_3\underset{SC_2H_5}{\text{CHCH}_2\text{CH}}(SC_2H_5)^2$" read -- $CH_3\underset{SC_2H_5}{\text{CHCH}_2\text{CH}}(SC_2H_5)_2$ --.

Signed and sealed this 4th day of April 1961.

(SEAL)
Attest:    ERNEST W. SWIDER
~~KARL H. AXLINE~~
Attesting Officer

ARTHUR W. CROCKER
                                     Acting Commissioner of Patents

UNITED STATES PATENT OFFICE
CERTIFICATE OF CORRECTION

Patent No. 2,912,468                       November 10, 1959
John W. Copenhaver

It is hereby certified that error appears in the above numbered patent requiring correction and that the said Letters Patent should read as corrected below.

Column 6, line 3, for "mercaptal" read --- butyral ---.

Signed and sealed this 10th day of April 1962.

(SEAL)
Attest:

ERNEST W. SWIDER                          DAVID L. LADD
Attesting Officer                              Commissioner of Patents